United States Patent
Van Lerberghe

Patent Number: 6,020,086
Date of Patent: Feb. 1, 2000

[54] ACCUMULATOR DEVICE FOR AN ELECTRIC AND/OR ELECTRONIC APPARATUS HAVING A CURVED SHAPE

[75] Inventor: Steven Van Lerberghe, Le Mans, France

[73] Assignee: U.S. Philips Corporation, New York, N.Y.

[21] Appl. No.: 08/981,191

[22] PCT Filed: Apr. 3, 1997

[86] PCT No.: PCT/IB97/00339

§ 371 Date: Dec. 11, 1997

§ 102(e) Date: Dec. 11, 1997

[87] PCT Pub. No.: WO97/38453

PCT Pub. Date: Oct. 16, 1997

[30] Foreign Application Priority Data

Apr. 11, 1996 [FR] France .................................. 9604523

[51] Int. Cl.[7] .................................................. H01M 2/02
[52] U.S. Cl. ........................... 429/163; 429/164; 429/127
[58] Field of Search ................................... 429/100, 164, 429/163, 162, 176, 177, 96, 97, 98, 127, 99, 121, 94; 206/703

[56] References Cited

U.S. PATENT DOCUMENTS

| | | | |
|---|---|---|---|
| Re. 31,413 | 10/1983 | Jaggard | 429/27 |
| 4,262,064 | 4/1981 | Nagle | 429/94 |
| 4,429,025 | 1/1984 | Stow | 429/97 |
| 5,047,300 | 9/1991 | Juergens | 429/94 |
| 5,198,313 | 3/1993 | Juergens | 429/94 |
| 5,629,107 | 5/1997 | Shioda et al. | 429/128 |
| 5,683,831 | 11/1997 | Baril et al. | 429/96 |
| 5,695,885 | 12/1997 | Malhi | 429/7 |
| 5,770,333 | 6/1998 | Saito et al. | 429/194 |

FOREIGN PATENT DOCUMENTS

| | | |
|---|---|---|
| 0374548A2 | 6/1990 | European Pat. Off. |
| 58197655A | 11/1983 | Japan . |
| WO9103921 | 3/1991 | WIPO . |

*Primary Examiner*—Maria Nuzzolillo
*Assistant Examiner*—Jennifer O'Malley
*Attorney, Agent, or Firm*—Dicran Halajian

[57] ABSTRACT

An accumulator device for an electric or electronic apparatus includes an active element for charging and for producing electric power, and a casing for the active element. In order to counterbalance the pressure increase occurring during the charging operation of the active element, the casing for the active element is curved.

10 Claims, 4 Drawing Sheets

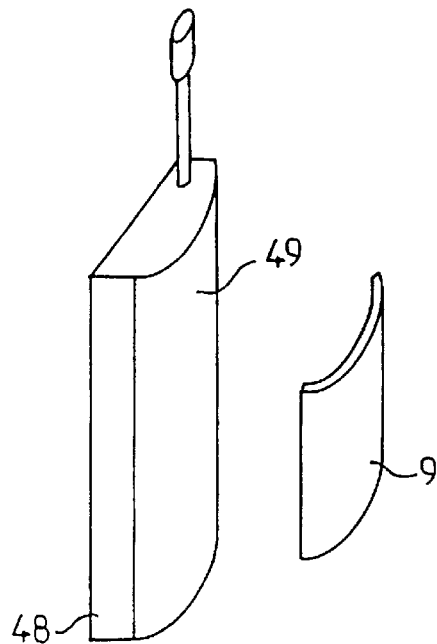
FIG. 7
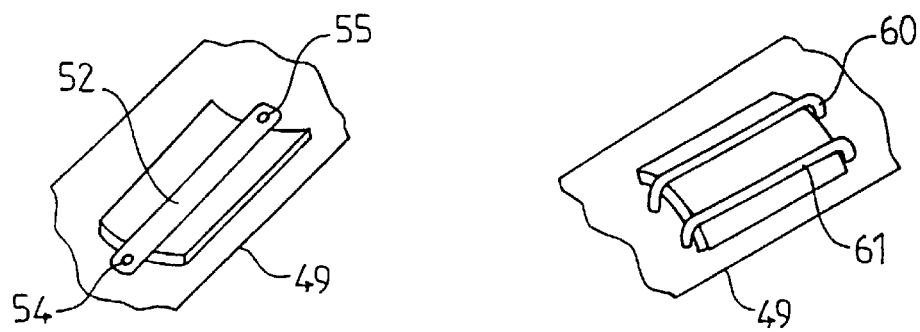
FIG. 8
FIG. 9
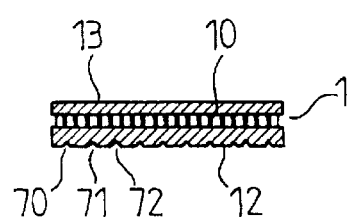
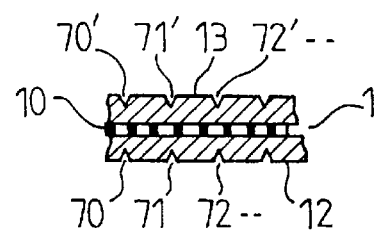
FIG. 10

ACCUMULATOR DEVICE FOR AN ELECTRIC AND/OR ELECTRONIC APPARATUS HAVING A CURVED SHAPE

BACKGROUND OF THE INVENTION

FIELD OF THE INVENTION

The invention relates to an accumulator device for an electric and/or electronic apparatus comprising:
- an active element for charging and for producing the electric power,
- a casing for containing said active element.

The invention likewise relates to a type of portable radio telephone notably comprising such a device.

A problem often faced with accumulators is caused by the increase of pressure during the charging operation. This increase of pressure becomes formidable with accumulators which use active elements notably of the lithium-ion type. To avoid the unwanted effects of this pressure, a robust casing is known to be provided for packing this active element. Metallic casings are then used which are considered too heavy and too costly. This is considered disadvantageous.

It is suitable to note that certain accumulators need to have a certain pressure for operating properly.

The invention proposes a device of the type defined in the opening paragraph for which the problem of rising pressure is solved in a satisfactory manner without costing too much and which thus does not have the drawback mentioned earlier.

SUMMARY OF THE INVENTION

Therefore, such a device is characterized in that said casing is curved, so that the increase of pressure occurring during the charging operation is counterbalanced.

The invention is based on the recognition that a curved structure is used which is a robust structure and can thus easily withstand a growing pressure.

Thus, the advantage is obtained that the accumulator device can have a structure which is thin enough similar to bank cards.

These and other aspects of the invention will be apparent from and elucidated with reference to the embodiments described hereinafter.

BRIEF DESCRIPTION OF THE DRAWINGS

In the drawings:

FIG. 7 shows an apparatus in accordance with the invention, on which an accumulator device has just been installed, FIG. 8 shows a fourth embodiment of the invention, FIG. 9 shows a fifth embodiment of the invention, FIG. 10 shows a way of facilitating the curvature of the casing.

DESCRIPTION OF THE PREFERRED EMBODIMENTS

Figure 1:
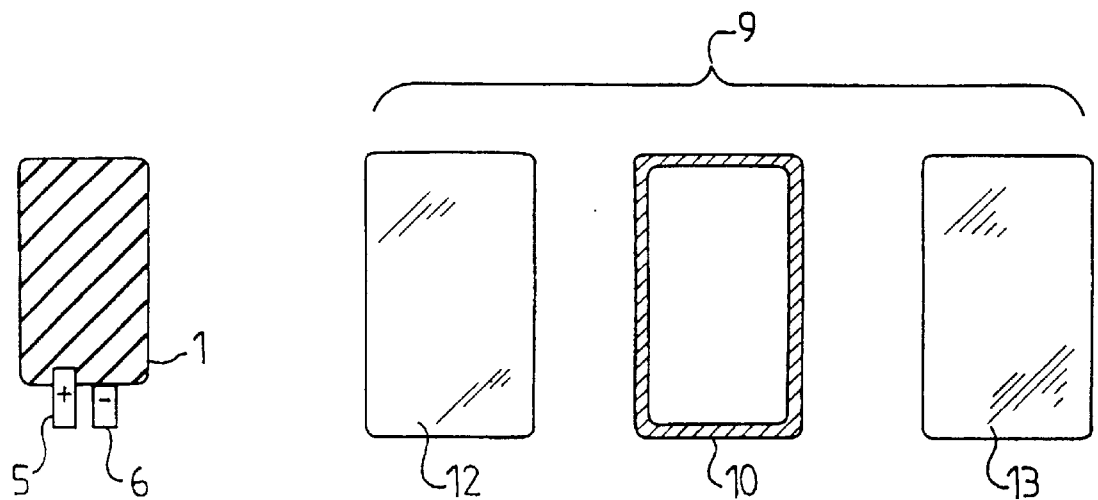
FIG. 1 shows the various components forming the device according to the invention.
Figure 2:
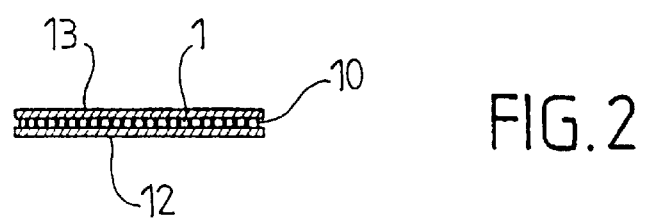
FIG. 2 shows an elevational view of the arrangement of the components of FIG. 1.

In FIG. 1, the active element 1 is an element which presents itself in the form of a plate. Elements of this type are mentioned in U.S. Pat. Nos. 5,047.300 and 5,198,313. Two electrodes 5 and 6 permit of charging and providing the energy. These electrodes may be bent according to the user's wishes. For protecting this active element 1 against the environment, a casing 9 is necessary. It is formed by a frame 10 and two caps 12 and 13. The active element 1 is placed inside the frame 10. The two caps 12 and 13 are flush-mounted with the walls of the frame 10, so that the active element 1 is inserted into the casing thus formed. The casing then has the form of a prism. FIG. 2 shows in an elevational view the casing with the active element inside it. The casing may be formed by plastic material of which well-known bank cards are formed. One may thus obtain a very flat aspect of the device according to the invention which is similar to bank cards or any other card of this type (telephone card etc.).

Figure 3:
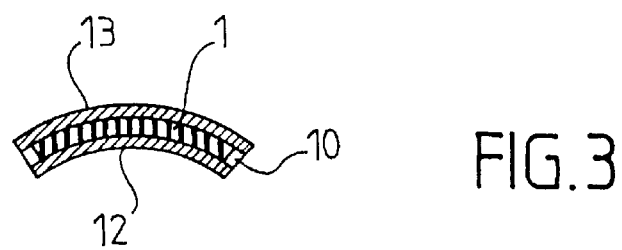
FIG. 3 shows the curvature of these components according to the invention.

In accordance with the invention, said casing is curved as is shown in FIG. 3. The curvature of the casing is obtained either by curving means which control the resilience of the casing, or this curvature is final as a result of the initial concept of the casing.

For obtaining this curvature, the invention proposes a plurality of variants of embodiments.

Figure 4:
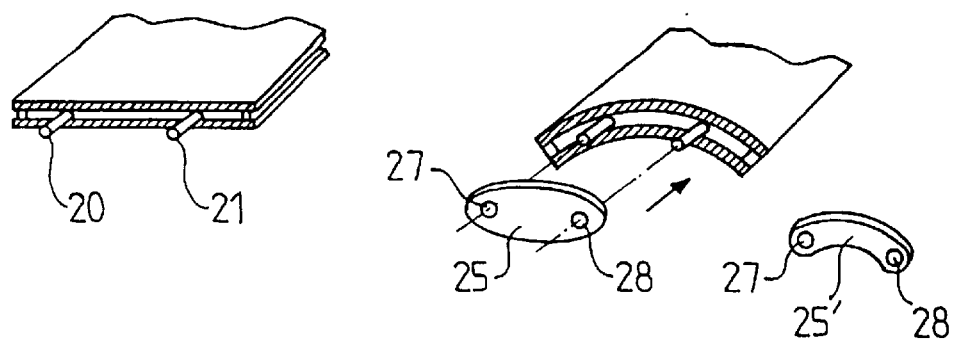
FIG. 4 shows a first embodiment of the invention.

A first variant is shown in FIG. 4. Two pins, or protrusions, 20 and 21, are provided on a side wall of the casing which is to be curved. A blocking part 25, which has two openings 27 and 28 for receiving the two pins in accordance with the curvature of the casing, maintains the curvature at the desired value. It will be evident that the invention also covers the fact that openings may also be made in the wall of the casing while pins are provided on said blocking part. Instead of the part 25, a part 25' can be used whose form is such that it is aligned to the curvature it provides.

Figure 5:
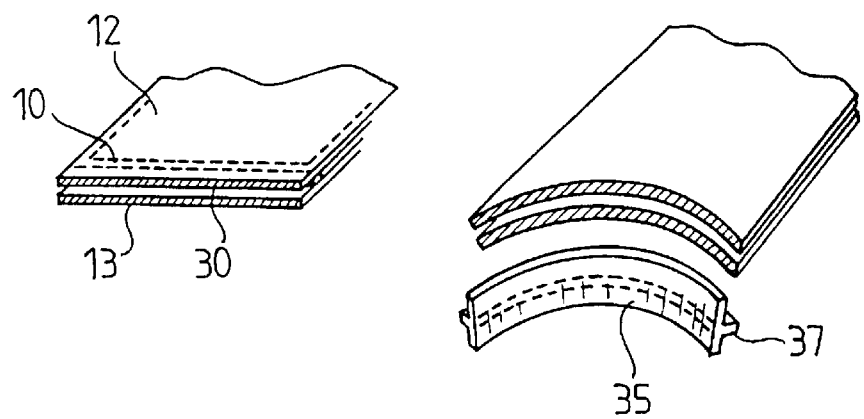
FIG. 5 shows a second embodiment of the invention.

A second variant is shown in FIG. 5. A groove 30 is made in the wall of the casing intended to be curved. This groove may be obtained by having the caps 12 and 13 project from the frame 10 shown in a dashed line in FIG. 5. Another blocking part 35 which cooperates with this groove has a rim 37 intended to fit in said groove 30 thus imposing the desired curvature. There too, without leaving the scope of the invention, the role of the groove and the rim may be exchanged.

Figure 6:
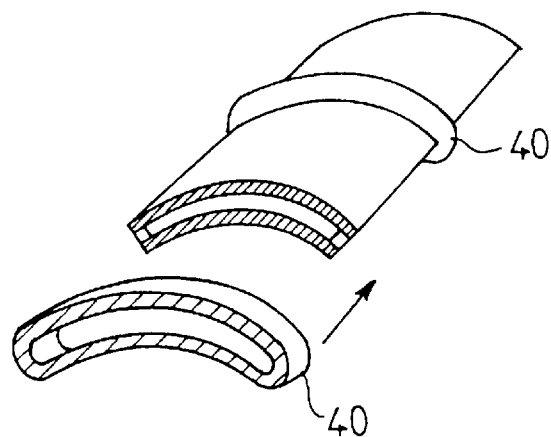
FIG. 6 shows a third embodiment of the invention.

A third variant is shown in FIG. 6. In this variant is used at least a ring 40 which has an opening, so that, when the casing is slipped into it, the ring imposes the desired curvature. It is then possible to slip two rings on each one of the ends of the casing.

FIG. 7 shows an apparatus 48. This apparatus has a face 49 with a curvature. Thus the device according to the invention can profit from this curvature by conforming in shape thereto. Various fastening means can be provided in this case.

FIG. 8 shows a first one of these fastening means. A plate 52 maintains the device on the inside of the face 49. This plate 52 is fastened to this face 49 at two fastening points 54 and 55.

FIG. 9 shows a second one of these fastening means. Two fasteners 60 and 61, for example, around the device according to the invention, fasten the device on the outside to the face 49. In the latter two cases it is also possible to use magnetic attraction systems.

FIG. 10 shows a means for facilitating the curvature of the casing. Therefore, at least one of the caps 12 or 13 has grooves 70, 71, 72 . . . which may be obtained by removing material, so that small ribs arise. Thus, the rigidity/flexibility ratio is changed in one direction.

Figure 11:
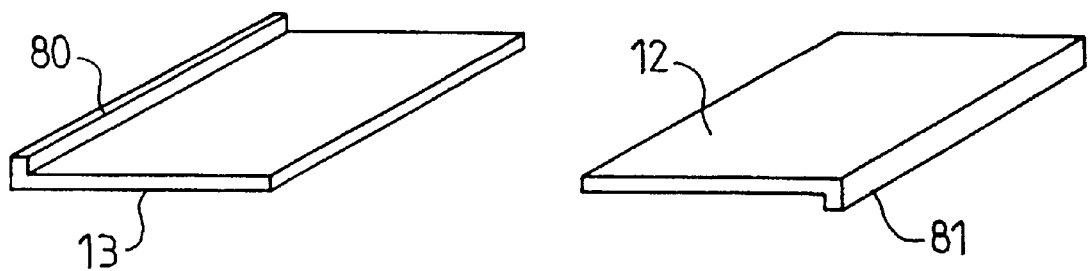
FIG. 11 shows a sixth embodiment of the device according to the invention.
Figure 12:
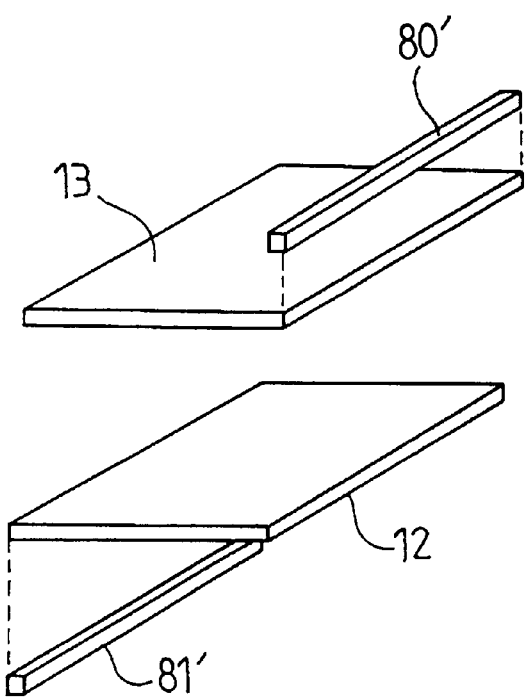
FIG. 12 shows a variant of the embodiment shown in FIG. 11.

This ratio may also be changed if raised edges 80 and 81. which rigidify the casing without hindering its curvature as this is shown in FIG. 11, are provided on the caps 12 and 13. These raised edges may be separate parts 80' and 81' which are stuck or soldered onto the caps as is shown in FIG. 12.

What is claimed is:

1. An accumulator comprising:
    an active element for charging and for producing electric power;
    a casing for containing said active element, wherein said casing has a curved shape to counterbalance an increase of pressure occurring during charging of said active element; and
    curving means having a system of pins and openings to maintain said curved shape.

2. An accumulator comprising:
    an active element for charging and for producing electric power;
    a casing for containing said active element, wherein said casing has a curved shape to counterbalance an increase of pressure occurring during charging of said active element; and
    curving means having a system of a groove and a rim to maintain said curved shape.

3. An accumulator comprising:
    an active element for charging and for producing electric power;
    a casing for containing said active element, wherein said casing has a curved shape to counterbalance an increase of pressure occurring during charging of said active element; and
    curving means having at least a ring in which the accumulator is slipped to maintain said curved shape.

4. An accumulator comprising:
    an active element for charging and for producing electric power;
    a casing for containing said active element, wherein said casing has a curved shape to counterbalance an increase of pressure occurring during charging of said active element; and
    curving means having fastening means for fastening the accumulator on a curved surface of an electrical apparatus to maintain said curved shape.

5. The accumulator of claim 4, wherein said electrical apparatus includes a telephone.

6. The accumulator of claim 4, wherein said casing has a cylindrical form.

7. The accumulator of claim 4, wherein said casing is curved around said curved surface.

8. The accumulator of claim 4, wherein said casing is curved within said curved surface.

9. An accumulator comprising:
    an active element for charging and for producing electric power;
    a casing for containing said active element, wherein said casing has a curved shape to counterbalance an increase of pressure occurring during charging of said active element; and
    curving means to maintain said curved shape; said casing having grooves on at least one side to facilitate shaping said curved shape.

10. The accumulator of claim 9, wherein said casing has raised edges on at least one face so as to rigidify said casing in a direction other than a curvature of said curved shape.

* * * * *